(No Model.)
E. L. PERRY.
BLADDER VALVE.
No. 329,773. Patented Nov. 3, 1885.
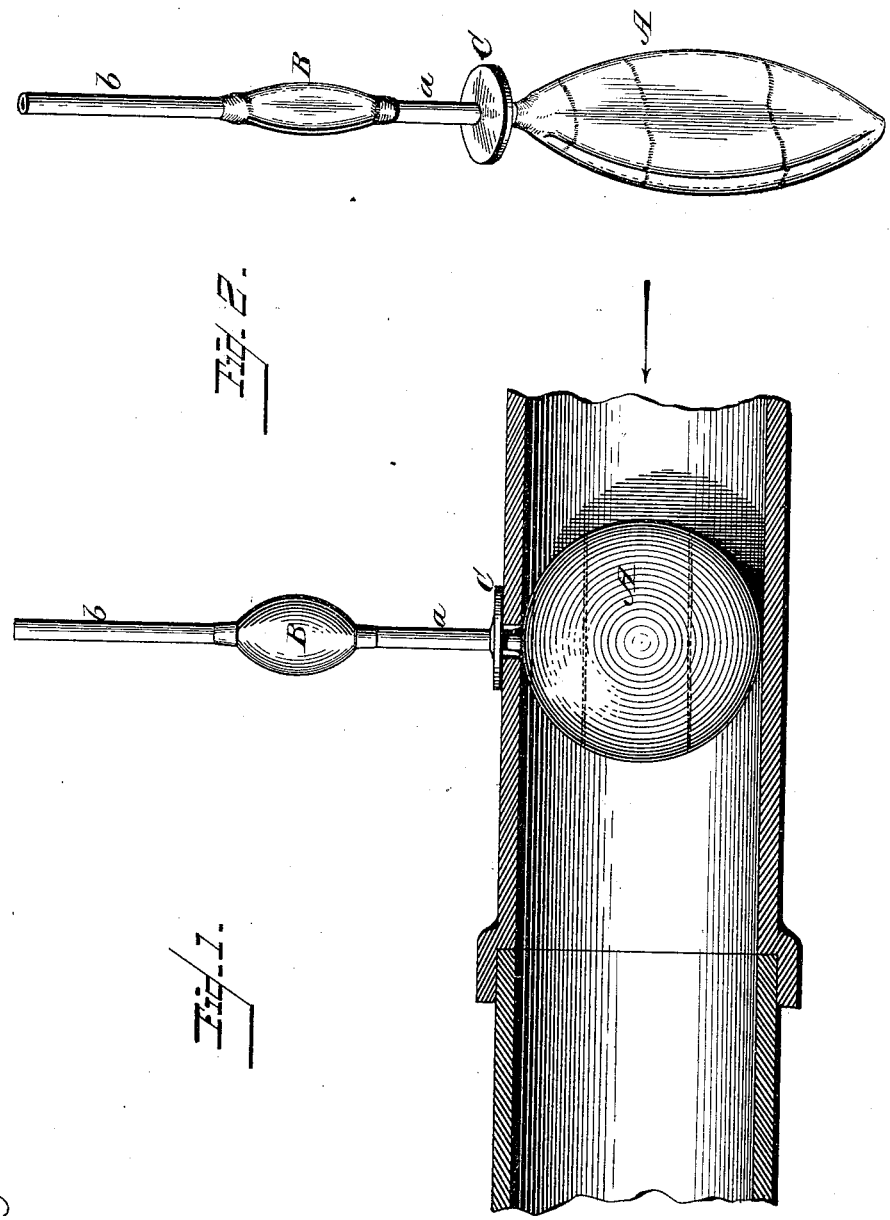

UNITED STATES PATENT OFFICE.

EDWARD L. PERRY, OF PATERSON, NEW JERSEY, ASSIGNOR TO HIMSELF AND HENRY S. WINANS, OF NEW YORK, N. Y.

BLADDER-VALVE.

SPECIFICATION forming part of Letters Patent No. 329,773, dated November 3, 1885.

Application filed July 20, 1885. Serial No. 172,077. (No model.)

*To all whom it may concern:*

Be it known that I, EDWARD L. PERRY, a citizen of the United States, residing at Paterson, in the county of Passaic and State of New Jersey, have invented certain new and useful Improvements in Bladder-Valves; and I do hereby declare that the following is a full, clear, and exact description of the same, reference being had to the annexed drawings, making a part of this specification, and to the letters and figures of reference marked thereon.

Figure 1 of the drawings is a view showing my improved device inflated and in use, and Fig. 2 a detail view thereof with the air exhausted.

The present invention has relation to that class of devices known in the art as "bladder-valves," especially adapted for use in stopping the flow of gas in mains while they are being repaired. When a fractured pipe required to be removed from the middle of a long run of main, or a leak at any point around the joint necessitated being repaired, it has been a usual custom to drill a hole of suitable size through the upper side of the pipe and through this hole insert an empty bladder furnished with a small tube and stop-cock. The bladder, after being folded and inserted through the hole in the main, was inflated by forcing air through the tube, which would fill up the main and stop the escape of gas, thus forming a temporary valve, which, after the repairs were finished, would be exhausted of air and the bladder removed through the hole in the main, and the hole afterward plugged or stopped up. The serious trouble that existed in this class of devices was the danger of the bladder bursting, as it was located inside the main, and consequently there was no means of ascertaining when the bladder was full, and frequently they would burst and the gas rush out and overcome the workman in the trench.

The object of the present invention, therefore, is to remedy this difficulty by providing means for ascertaining when the bladder becomes full, also a packing disk or washer to cover the hole in the main while the bladder is being inflated, thus preventing the escape of gas. These objects I attain by the construction substantially as shown in the drawings and hereinafter described and claimed.

In the accompanying drawings, A represents what is termed in the art a "bladder-valve," composed of any suitable material that is susceptible of being inflated by either air or water into a cylindrical form or of the desired shape to fill up the bore in the main, rubber, however, being preferred as a material from which to construct the valve.

In Fig. 1 I have shown the valve A as it appears when inflated, and showing it in position in the main. The valve is provided with a suitable tube, $a$, of any desired length and diameter, which is also preferably of rubber, and has an elastic packing disk or washer, C, which is held down over the hole through the main or pipe section thereof, so as to prevent the gas escaping through the hole during the process of inflating the valve. The valve A, I provide with a suitable indicator, which is located upon the outside of the main, in full view of the workmen, said indicator consisting of a flexible hollow bulb, B, preferably of rubber, which joins with the upper end of the tube $a$, and above with a similar tube, $b$. This bulb may be connected to the tubes in any suitable manner by couplings or otherwise, and the elastic packing disk or washer may be permanently attached to the tube or made loose thereon, as found desirable. In inflating the valve with air it can be accomplished by means of a bellows or other air-forcing device, or with a bulb; or, if preferred, the valve may be filled with water in any convenient manner. As the valve becomes full, the bulb will fill and expand, thus indicating when the valve is sufficiently supplied with air or water to properly inflate it, thereby giving notice to turn off the supply by a stop-cock or other suitable means before there is danger of bursting the valve.

Having now fully described my invention, what I claim as new, and desire to secure by Letters Patent, is—

1. A bladder-valve provided with an indicator consisting of a flexible hollow bulb, substantially as and for the purpose set forth.

2. The combination, with a bladder-valve, of an indicator consisting of a flexible hollow bulb and a tube connecting said indicator with the valve, substantially as and for the purpose specified.

3. A bladder-valve provided with an indicator consisting of a flexible hollow bulb, a tube connecting it with the valve, and an elastic packing disk or washer upon said tube, substantially as and for the purpose set forth.

4. A bladder-valve and an indicator consisting of a flexible hollow bulb, in combination with a flexible tube connecting the valve with the indicator, and provided with an elastic packing disk or washer, substantially as and for the purpose described.

In testimony that I claim the above I have subscribed my name in the presence of two witnesses.

EDWARD L. PERRY.

Witnesses:
H. S. WINANS,
A. B. SMITH.